United States Patent
Persson

(10) Patent No.: US 6,675,782 B1
(45) Date of Patent: Jan. 13, 2004

(54) INTERNATIONAL COMBUSTION ENGINE WITH EXHAUST RECIRCULATION

(75) Inventor: Per Persson, Partille (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 09/936,221

(22) PCT Filed: Mar. 7, 2000

(86) PCT No.: PCT/SE00/00446
§ 371 (c)(1),
(2), (4) Date: Sep. 10, 2001

(87) PCT Pub. No.: WO00/53917
PCT Pub. Date: Sep. 14, 2000

(30) Foreign Application Priority Data

Mar. 9, 1999 (SE) .............................................. 9900839

(51) Int. Cl.⁷ .............................................. F02M 25/07
(52) U.S. Cl. ............................... 123/568.12; 60/605.2; 123/568.21
(58) Field of Search ...................... 123/568.12, 568.11, 123/568.21, 568.17, 568.2; 60/605.2, 605.1

(56) References Cited

U.S. PATENT DOCUMENTS 3,774,399 A * 11/1973 Nohira et al. ................. 60/278
6,167,703 B1 * 1/2001 Rumez et al. ................. 60/599
6,233,936 B1 * 5/2001 Hångkansson .............. 60/605.2
6,401,699 B1 * 6/2002 Persson et al. ........ 123/568.12
6,516,787 B1 * 2/2003 Dutart et al. ................ 123/539

FOREIGN PATENT DOCUMENTS

| SE | 49 844 | 10/1972 |
|----|--------|---------|
| SE | 456 176 | 9/1988 |
| SE | 510 223 | 5/1999 |

* cited by examiner

*Primary Examiner*—Mahmoud Gimie
(74) *Attorney, Agent, or Firm*—Young & Thompson

(57) ABSTRACT

Supercharged internal combustion engine with two separate exhaust manifolds (2a,2b) from individual cylinder groups and two separate inlet manifolds (3a,3b) each leading to a respective cylinder group. An inlet conduit (9) from a supercharger (6) leads to an equalising chamber (11), from which two tuned resonance tubes (12,13) lead to the inlet manifolds. From the exhaust manifolds a pair of exhaust recirculation conduits (19a,21a,19b,21b), each containing a control valve (18a,18b) controlled by a control unit (16) for controlling the exhaust recirculation, lead to the inlet manifolds. The control unit is disposed to open the control valves when the exhaust pressure is higher than the pressure in the inlet manifolds.

12 Claims, 2 Drawing Sheets

INTERNATIONAL COMBUSTION ENGINE WITH EXHAUST RECIRCULATION

FIELD OF THE INVENTION

The present invention relates to an internal combustion engine with a plurality of cylinders, comprising an inlet conduit which conducts inlet air to the cylinders of the engine, two separate exhaust manifolds each receiving exhaust from an individual group of cylinders, a charging unit, the pressure side of which communicates with the inlet air conduit, a conduit leading from each exhaust manifold to the inlet air conduit for recirculation of exhaust from the exhaust side of the engine to its inlet side, and valve means communicating with respective recirculation conduit and having control means disposed, under those conditions when exhaust is to be recirculated, to open the valve means when the exhaust pressure in the respective exhaust manifold is higher than the inlet pressure on the pressure side of the charge unit.

BACKGROUND OF THE INVENTION

In supercharged internal combustion engines, e.g. turbo engines, the charge pressure of the inlet air in the inlet manifold is often higher than the average pressure of the exhaust in the exhaust manifold, which means that conventional damper and valve means used in suction engines, cannot immediately be used in supercharged engines to return the exhaust to the pressure side of the compressor. In order to achieve this it is known to use some pressure increasing means on the exhaust side, e.g. a constriction in the form of a turbo unit with variable geometry, or some kind of pump device.

If the pressure increase principle is used, it means that the engine will operate against a pressure with its entire exhaust flow to return only a fraction of the flow, e.g. only about 10%, to the inlet side, which results in an undesirable loss of efficiency. The pump principle, in addition to involving extra expense and complication, involves a parasite loss corresponding to the pressure increase of about 10% of the exhaust flow divided by the efficiency of the pump, i.e. a total of about 20% of the exhaust flow times the pressure increase.

By SE-A-9603028-3 it is known in an internal combustion engine with exhaust recirculation in the recirculation conduit to arrange valve means with valve control means, which control the valve means so that during those operating conditions when exhaust is to be recirculated, the valve means only open when the exhaust pressure in the manifold is higher than the inlet pressure on the pressure side of the charge unit. This solution, which is much simpler and less expensive than a pump device and permits exhaust to be returned to the inlet side without any loss of efficiency, is based on the fact that the pressure during pressure pulsations in the exhaust manifold has pressure tops exceeding the charge pressure in the inlet manifold, and uses valve means which open during the pressure tops but which are kept closed therebetween to prevent inlet air from flowing to the exhaust side.

OBJECT OF THE INVENTION

The purpose of the present invention is to achieve an internal combustion engine with valves in the exhaust recirculation conduit controlled in this manner, which permits higher mass flow of recirculated gas to the pressure side of the charger than what has hitherto been possible.

SUMMARY OF THE INVENTION

This is achieved according to the invention by virtue of the fact that the inlet air conduit comprises an equalisation chamber, two separate inlet manifolds and two resonance pipes, each of which joins the equalisation chamber with an individual inlet manifold to an individual group of cylinders, said inlet manifolds each communicating via an individual recirculation conduit with an individual exhaust manifold, and that control means are disposed to open the valve means when the exhaust pressure is higher than the pressure in the inlet manifolds.

By using the principle, known per se with an equalizing chamber and tuned resonance pipes from separate inlet pipes together with the control, also known per se, of the exhaust recirculation valves, it has been demonstrated that the mass flow of recirculated exhaust has been able to be increased to a surprising degree, under certain operating conditions as much as 50% over an inlet system without tuned resonance pipes.

BRIEF DESCRIPTION OF THE DRAWINGS

The invention will be described in more detail below with reference to examples shown in the accompanying drawings, where FIG. 1 schematically shows one embodiment of an internal combustion engine according to the invention.

DETAILED DESCRIPTION OF THE INVENTION

Figure 1:
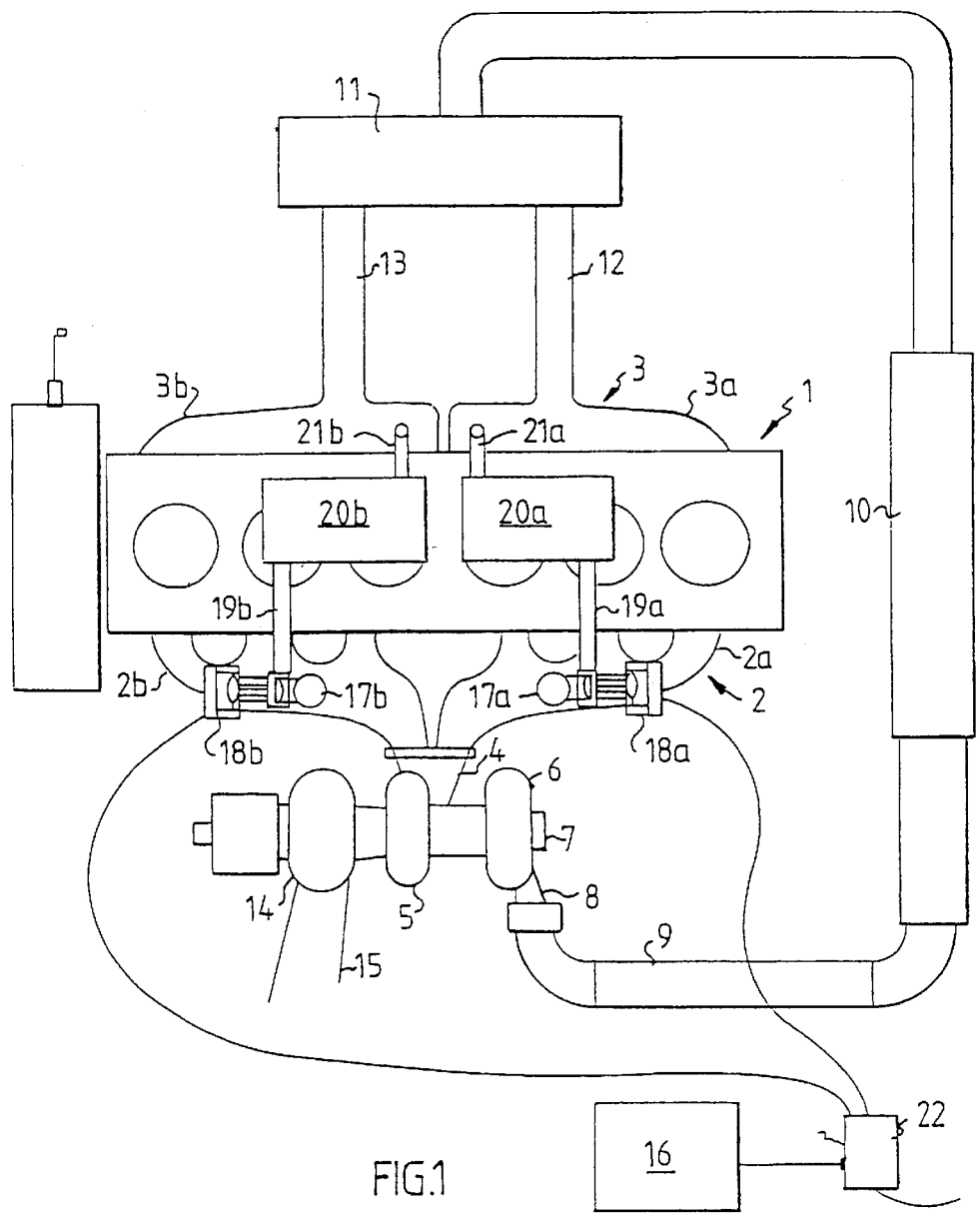

In FIG. 1, 1 designates a six cylinder diesel engine with an exhaust manifold 2 and an inlet manifold 3. The exhaust manifold 2 is divided into two sections 2a and 2b, each having three branches, opening into the exhaust channels of the engine. The inlet manifold 3 is in a corresponding manner divided into two sections 3a and 3b each having three branches, opening into the engine inlet channels. The manifold sections 2a, 2b open into the inlet 4 of an exhaust turbine 5, to which a compressor 6 is drivingly coupled. The compressor 6 has an inlet 7 for inlet air and an outlet 8 coupled to an inlet air conduit 9 which, via a charge air cooler 10, leads the inlet air to a chamber in an equalisation container 11, which, via a first resonance tube 12 and a second resonance tube 13 communicates with the respective inlet manifold 3a and 3b. The exhaust turbine 5 is connected to an exhaust pipe 15 via a pressure regulator 14.

16 designates in general a control, which is known per se, which is preferably a micro computer which controls various engine and vehicle functions depending on engine data fed into the control unit such as charge pressure, engine rpm and air temperature as well as vehicle data such as ABS on/off, vehicle speed, accelerator position etc.

Each manifold section 2a, 2b is joined to a short pipe 17a, 17b opening inside the respective manifold section and joined to the inlet of a control valve 18a, 18b, each joined to an exhaust recirculation conduit 19a and 19b, respectively, opening each into an individual cooler 20a, 20b from which conduits 21a, 21b lead to respective inlet manifolds 3a, 3b. The control unit 16 controls the control valves 18*a*, 18*b* and thus determines the flow of recirculated exhaust to the inlet side.

When the operating condition of the engine is such that exhaust is to be recirculated to the inlet side, the control unit 16, via an amplifier 22, sends signals to the control valves 18*a*, 18*b* to open, but only after the pressure of the exhaust pulses in the respective exhaust manifolds exceeds the charge air pressure in respective inlet manifold 3*a*, 3*b*. For maximum exhaust recirculation, the valves are held fully open till the exhaust pressure and the charge pressure are essentially equal. By varying the opening times and the degree of opening of the valves, the amount of recirculated exhaust can be regulated. In a six cylinder engine with a common valve 18*a*, 18*b* for three cylinders, the valves should open three times per two crankshaft rotations.

Figure 2:
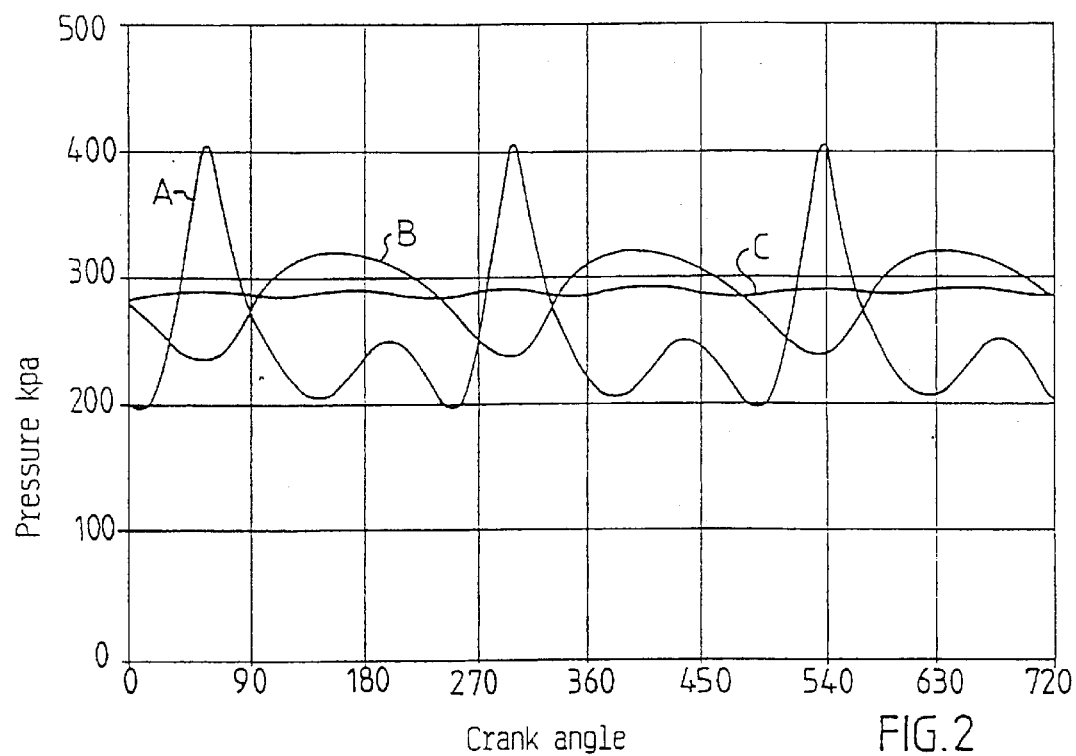
FIG. 2 shows a diagram illustrating the variations in exhaust pressure in the exhaust manifolds and the variations in charge pressure in the charge air cooler and in the inlet manifolds over two crankshaft rotations of a six cylinder engine.

In the diagram in FIG. 2 the curve A illustrates the pressure variations in the exhaust manifold 2*a*, the curve B the pressure variations in the inlet manifold 3*a* and the curve C the pressure in the charge air cooler 10 over two crank shaft rotations. In the exhaust manifold 2*b* and the inlet manifold 3*b* the corresponding pressures A and B prevail but displaced 120°. As a comparison shows, a significantly greater difference is obtained between the exhaust pressure A and the resonance pressure B than between exhaust pressure A and the charge pressure C, which is essentially constant. Furthermore, it is evident that the exhaust pressure is higher over a somewhat greater crankshaft angle. Both of these factors contribute to the fact that the amount of recirculated exhaust, during certain operating conditions, can increase by up to 50% over the case where only the difference between the charge pressure without resonance charging and the exhaust pressure is used in accordance with what is previously known by the above cited SE-A-9603028-3.

Figure 3:
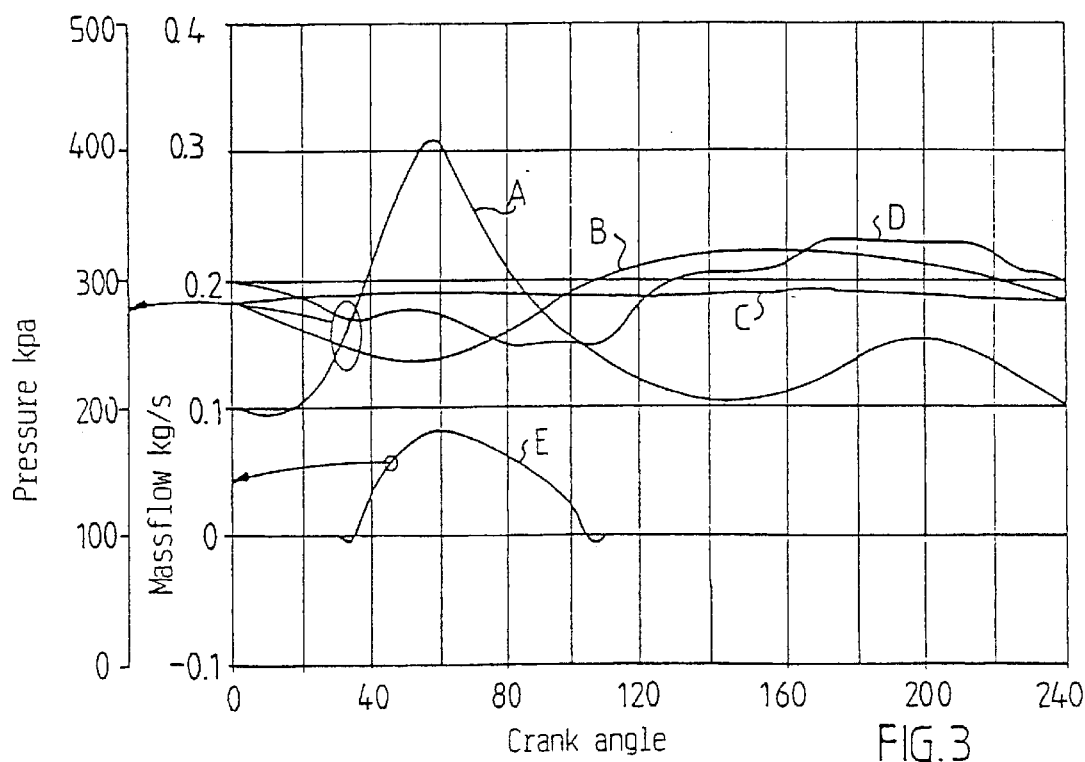
FIG. 3 shows a corresponding diagram over a third of a crankshaft rotation but also including diagrams of the exhaust pressure in the recirculation conduit downstream of the valves and the mass flow through the valves.

The diagram in FIG. 3 shows the pressure curves A, B and C over a third of a crankshaft rotation together with a curve D representing the pressure in the recirculation conduit 19*a* downstream of the control valve 18*a* and a curve E representing the mass flow through the valves. For the conduit 19*b* and the valve 18*b* the same values apply with 120° phase displacement. As can be seen from curve E a mass flow is obtained through the control valves over a crankshaft angle of circa 70 degrees, which is to be compared with an angle of circa 45 degrees without resonance charging. The phase displacement between the pressures and the mass flow is dependent on the pipe length of the recirculation conduits. In the example shown, the conduits are relatively short and the conduits lead from the exhaust manifolds 2*a*, 2*b* of the respective cylinder group to the inlet manifolds 3*a*, 3*b* of the same cylinder group. If the conduits 19*a*, 19*b* are so long that the pipe lengths in combination with speed of sound result in an unacceptably large phase displacement, this will be compensated for by having the conduits from the exhaust manifold 2*a*, 2*b* from one cylinder group lead to the inlet manifold 3*b*, 3*a* of the other cylinder group.

What is claimed is:

1. Internal combustion engine with a plurality of cylinders, comprising an inlet conduit which conducts inlet air to the cylinders of the engine, two separate exhaust manifolds each receiving exhaust from an individual group of cylinders, a charging unit, the pressure side of which communicates with the inlet air conduit, a conduit leading from each exhaust manifold to the inlet air conduit for recirculation of exhaust from the exhaust side of the engine to its inlet side, and valve means communicating with respective recirculation conduit and having control means disposed, under those conditions when exhaust is to be recirculated, to open the valve means when the exhaust pressure in the respective exhaust manifold is higher than the inlet pressure on the pressure side of the charge unit, characterised in that the inlet air conduit (9) comprises an equalisation chamber (11), two separate inlet manifolds (3*a*,3*b*) and two resonance pipes (12,13), each of which joins the equalisation chamber with an individual inlet manifold to an individual group of cylinders, said inlet manifolds each communicating via an individual recirculation conduit (19*a*, 21*a*,19*b*,21*b*) with an individual exhaust manifold (2*a*,2*b*), and that control means (16) are disposed to open the valve means (18*a*,18*b*) when the exhaust pressure is higher than the pressure in the inlet manifolds.

2. Internal combustion engine according to claim 1, characterised in that the recirculation conduit (19*a*,21*a*,19*b*, 21*b*) from an exhaust manifold (2*a*,2*b*) belonging to a cylinder group leads to the inlet manifold (3*a*,3*b*) belonging to the same cylinder group.

3. Internal combustion engine according to claim 1, characterised in that the recirculation conduit from an exhaust manifold (2*a*,2*b*) belonging to one cylinder group leads to the inlet manifold (3*b*,3*a*) belonging to the other cylinder group.

4. Internal combustion engine according to claim 1, characterised in that the valve means (18*a*,18*b*) are formed of two solenoid valve which are controlled by a control unit (16) which is disposed, depending on engine data fed into the control unit, to open the respective valve when the exhaust pressure in the associated exhaust manifold (2*a*,2*b*) is higher than the inlet air pressure in the associated inlet manifold (3*a*,3*b*).

5. Internal combustion engine according to claim 1, characterised in that the recirculation conduits (19*a*,21*a*,19*b*, 21*b*) communicate with the inlet manifolds via coolers (20*a*,20*b*).

6. Internal combustion engine according to claim 2, characterised in that the valve means (18*a*,18*b*) are formed of two solenoid valve which are controlled by a control unit (16) which is disposed, depending on engine data fed into the control unit, to open the respective valve when the exhaust pressure in the associated exhaust manifold (2*a*,2*b*) is higher than the inlet air pressure in the associated inlet manifold (3*a*,3*b*).

7. Internal combustion engine according to claim 3, characterised in that the valve means (18*a*,18*b*) are formed of two solenoid valve which are controlled by a control unit (16) which is disposed, depending on engine data fed into the control unit, to open the respective valve when the exhaust pressure in the associated exhaust manifold (2*a*,2*b*) is higher than the inlet air pressure in the associated inlet manifold (3*a*,3*b*).

8. Internal combustion engine according to claim 2, characterised in that the recirculation conduits (19*a*,21*a*,19*b*, 21*b*) communicate with the inlet manifolds via coolers (20*a*,20*b*).

9. Internal combustion engine according to claim 3, characterised in that the recirculation conduits (19*a*,21*a*,19*b*, 21*b*) communicate with the inlet manifolds via coolers (20*a*,20*b*).

10. Internal combustion engine according to claim 4, characterised in that the recirculation conduits (19*a*,21*a*,19*b*, 21*b*) communicate with the inlet manifolds via coolers (20*a*,20*b*).

11. Internal combustion engine according to claim 6, characterised in that the recirculation conduits (19*a*,21*a*,19*b*, 21*b*) communicate with the inlet manifolds via coolers (20*a*,20*b*).

12. Internal combustion engine according to claim 7, characterised in that the recirculation conduits (19*a*,21*a*,19*b*, 21*b*) communicate with the inlet manifolds via coolers (20*a*,20*b*).

* * * * *

UNITED STATES PATENT AND TRADEMARK OFFICE
CERTIFICATE OF CORRECTION

PATENT NO. : 6,675,782 B2  
DATED : January 13, 2004  
INVENTOR(S) : Persson, Per It is certified that error appears in the above-identified patent and that said Letters Patent is hereby corrected as shown below:

<u>Title page, Item [54], and Column 1, line 1,</u>  
Title, change "INTERNATIONAL" to -- INTERNAL -- so that the title reads as follows:  
-- INTERNAL COMBUSTION ENGINE WITH EXHAUST RECIRCULATION --.

Signed and Sealed this

Twelfth Day of October, 2004

JON W. DUDAS  
*Director of the United States Patent and Trademark Office*